Patented Dec. 14, 1937

2,101,998

UNITED STATES PATENT OFFICE 2,101,998

PURIFICATION OF LACTIC ACID

Ivan L. Haag, Lakewood, and Charles A. Vana, Cleveland, Ohio, assignors, by mesne assignments, to E. I. du Pont de Nemours & Company, Wilmington, Del., a corporation of Delaware No Drawing. Application March 11, 1935, Serial No. 10,458

2 Claims. (Cl. 260—122)

The present invention relates to a method of purifying lactic acid and comprises treating lactic acid containing various organic and inorganic impurities with nitric acid and removing from the so treated acid the excess nitric acid and the reaction products of said impurities with the nitric acid.

Lactic acid when produced by synthetic methods as well as when obtained by fermentation processes contains various organic impurities which impart a color and a disagreeable odor to the acid and render it unfit for edible or pharmaceutical purposes.

Inorganic impurities are usually eliminated by distillation of the acid but it is more difficult to remove organic impurities. Extraction of the lactic acid from its aqueous solutions by various organic solvents, of which isopropyl ether has lately been shown to be particularly effective, also allows of eliminating inorganic impurities and at the same time produces acids containing considerably less organic impurities, but extracted lactic acid has always been colored and while it may be produced in this manner pure enough for edible purposes, the production of a lactic acid which would satisfy the requirements of the U. S. Pharmacopoeia has heretofore necessitated complicated and expensive operations.

A process producing U. S. P. lactic acid is disclosed in an application by one of us, I. L. Haag, Ser. No. 665,976, filed April 13, 1933, for Purification of lactic acid. It is shown in this application that one can obtain a U. S. P. lactic acid by treating a partly purified lactic acid at elevated temperature with an oxidizing agent and subsequently distilling the acid.

One of us, C. A. Vana, has shown in his application Ser. No. 698,541, filed Nov. 17, 1934, for Deodorization of lactates, that ozone is an oxidizing agent having certain advantages for use in the purification of lactic acid.

The present invention is directed to the use of nitric acid as an oxidizing agent and to means of removing the excess nitric acid from the lactic acid.

We found that small amounts of nitric acid when added to lactic acid react at elevated temperature with the organic impurities contained therein which are responsible for the brown ring shown in the tests of the U. S. Pharmacopoeia, the color and the empyreumatic odor of impure lactic acid. We do not know what becomes of these impurities or what the reaction products are, but we have also found how to further treat the lactic acid so as to eliminate the excess nitric acid required in the treatment.

This elimination of the excess nitric acid consists in reducing the nitric acid to lower oxides of nitrogen which are then absorbed, eliminated as gas or reacted chemically to compounds which can be eliminated by distilling the treated acid. Agents with which we can eliminate the nitric acid in this manner are heavy, base metals such as aluminum and copper which form compounds with the nitric acid and lower nitrogen oxides which then remain dissolved in the treated lactic acid and on distilling remain in the distillation residue.

Absorbent carbon, such as decolorizing carbon, activated carbon, etc. were, however, found by us to be the most effective agents for eliminating the excess nitric acid from lactic acid. When the treated lactic acid containing residual amounts of nitric acid is heated to an elevated temperature with the addition of a few per cent of a decolorizing carbon there are small amounts of nitrogen oxide evolved and the acid when filtered off from the carbon is obtained in a state of very high purity.

It sometimes happens that the carbon used introduces slight amounts of chlorine and iron ions into the lactic acid. These must then be eliminated which we can, for instance, do by adding predetermined amounts of silver lactate which precipitates the chlorine ions as insoluble silver chloride and precipitation of the iron with the ferro-cyanide ion.

Our nitric acid treatment can be applied to crude, fermentation lactic acid where it produces a considerable improvement in the color, odor, etc. of the acid and renders it suitable for many technical uses for which the crude acid is not available.

When starting from a partly purified acid such as is obtained by extraction, crystallization and distillation processes our nitric acid treatment yields a product which satisfies all requirements of the U. S. Pharmacopoeia, and for most purposes requiring an acid of high purity no further distillation of the so purified lactic acid is needed.

The practical application of our novel purification process is illustrated in the following examples:

*Example 1.*—The acid started with was a partially purified lactic acid as is obtained by extracting crude fermentation lactic acid with isopropylether according to U. S. Patent 1,906,068, to J. A. Jenemann. This acid had a slight brownish color, a slight odor and gave a heavy brown ring in the U. S. Pharmacopoeia test for easily carbonizable matter.

This partially purified acid was heated in a stainless steel kettle to about 90° C.

2% of its weight of 70% commercial nitric acid were then added and the mixture heated with agitation for about 4 hours at 90 to 95° C. Some nitrogen oxides were evolved and the acid concentrated to about 80%. When the treatment was completed the acid showed a negative brown ring test as specified on pages 21 and 22 of the U. S. Pharmacopoeia, tenth decennial revision 1926.

The test referred to is described as follows:

"Carefully superimpose 5 cc. of lactic acid upon an equal volume of sulphuric acid in a clean test tube, and keep the temperature at 15° C.; no dark color develops at the zone of contact of the two liquids upon standing for 15 minutes. (Readily carbonizable substances.)"

The acid was then mixed with a few per cent of decolorizing carbon of the type known as Darco and agitated at 90 to 95° C. for a few hours. The treatment was considered finished when the following test showed satisfactory removal of nitrogen:

A clean piece of silver foil (1" x ½") is placed in a 25 cc. sample of the filtered acid in a 100 cc. beaker, covered with a watch glass, and the acid boiled for 10 minutes, cooled and the turbidity noted. When no, or only a very faint turbidity appears, we consider the treatment finished.

The acid was then cooled and decanted from the residual carbon.

Except for the impurities introduced by the carbon the acid would be of a purity satisfying the tests of the U. S. Pharmacopoeia.

To remove these impurities we diluted the acid to 50% strength and added just enough sodium ferrocyanide and silver lactate solutions to precipitate the iron and chlorine ions and decanted from the slight precipitates formed.

The so obtained acid was water white, of pleasant odor and gave a negative brown ring test.

If a stronger acid is desired it is possible to concentrate this pure acid by vacuum distillation.

This treatment can be applied to lactic acid of various concentrations. The amount of nitric acid used and its concentration can be varied within wide limits as can the temperature and time of heating, and these features will, to a large extent, depend upon the purity of the original lactic acid. The brown ring test of the pharmacopoeia is a convenient manner of determining the extent of the treatment and it is mainly by this test that the operator will be guided as to the concentrations, times and temperatures for his nitric acid treatment.

We found that it is not always necessary to use entirely new carbon for the removal of the excess nitric acid. It is very convenient to allow to accumulate the spent carbon of 3 or 4 batches and treat with it a subsequent batch of lactic acid, in this case only about 1% additional fresh carbon will be required for each batch.

We found, however, that for best results with decolorizing, or absorbent carbon the concentration of the lactic acid is not particularly important; excellent results have been obtained when the concentration was between 40 and 85% and the temperature maintained at at least 80° C. and preferably 90° or higher, as at a lower temperature the purification is much slower.

The silver foil test described above is, however, the best guide for successfully completing this treatment.

*Example 2.*—81 lbs. of 50% extracted lactic acid was heated with 0.81 lbs. of C. P. nitric acid at 90° C. for 5 hours. 112 grams of aluminum foil were then added and the temperature maintained at 90° C. for 5 hours, during which time the lactic acid concentrated to about 85%. Upon dilution of this acid to 50% and vacuum distillation a product of satisfactory odor and color was obtained. The diphenylamine test for nitrates and the brown ring test for easily carbonizable material were negative.

*Example 3.*—A similar test was made by using metallic copper instead of the aluminum foil. The treated acid was slightly discolored and cloudy but on dilution and vacuum distillation a satisfactory acid was obtained which was free from nitrates and easily carbonizable materials as was evidenced by negative diphenylamine and brown ring tests.

*Example 4.*—2000 parts by weight of crude 22% molasses-dark lactic acid was heated with 30 parts C. P. (70%) nitric acid for 4 hours at 95° C., maintaining about 22% concentration by addition of water. 30 parts of absorbent carbon known under the trade name Darco were then added and the temperature maintained at 95° C. for 7 hours. The lactic acid was then separated from the Darco. It was greatly improved in color and odor. As determined by the depth of column through which a standard light was visible the color of the acid was improved 840.0%.

*Example 5.*—1800 parts by weight of 50% light colored lactic acid as obtained by fermentation of starch were heated for 4 hours to 95° C. with the addition of 72 parts of C. P. (70%) nitric acid, and the concentration maintained at about 50% by the addition of water. 54 parts absorbent carbon were then added and the temperature maintained for another 7 hours at 95° C. The acid was then separated from the carbon. It was very low in nitrates, nearly odorless and its color showed a 2270.0% improvement over the starting material.

We claim:

1. In a process of purifying lactic acid containing organic impurities which cause the formation of a brown ring, according to the U. S. Pharmacopoeia test for easily carbonizable matter, the step of adding to said acid a small amount of nitric acid, heating said mixture, adding to said heated acid a small amount of an activated carbon, and heating said mixture whereby the nitric acid remaining in the lactic acid is reduced to nitrogen oxides which are evolved.

2. In a process of purifying lactic acid containing organic impurities which cause the formation of a brown ring, according to the U. S. Pharmacopoeia test for easily carbonizable matter, the steps of adding to said acid a few per cent of strong nitric acid, heating said mixture to a temperature above about 80° C., adding to said heated mixture a few per cent of activated carbon and heating said mixture to a temperature above about 80° C., whereby the nitric acid remaining in the lactic acid is reduced to nitrogen oxides which are evolved, and separating the treated acid from said activated carbon.

IVAN L. HAAG.
CHARLES A. VANA.